Jan. 22, 1952 E. J. H. DE RAEDT 2,582,967
MARKER-CONTROLLED FINAL SELECTOR CIRCUIT
Filed July 1, 1947
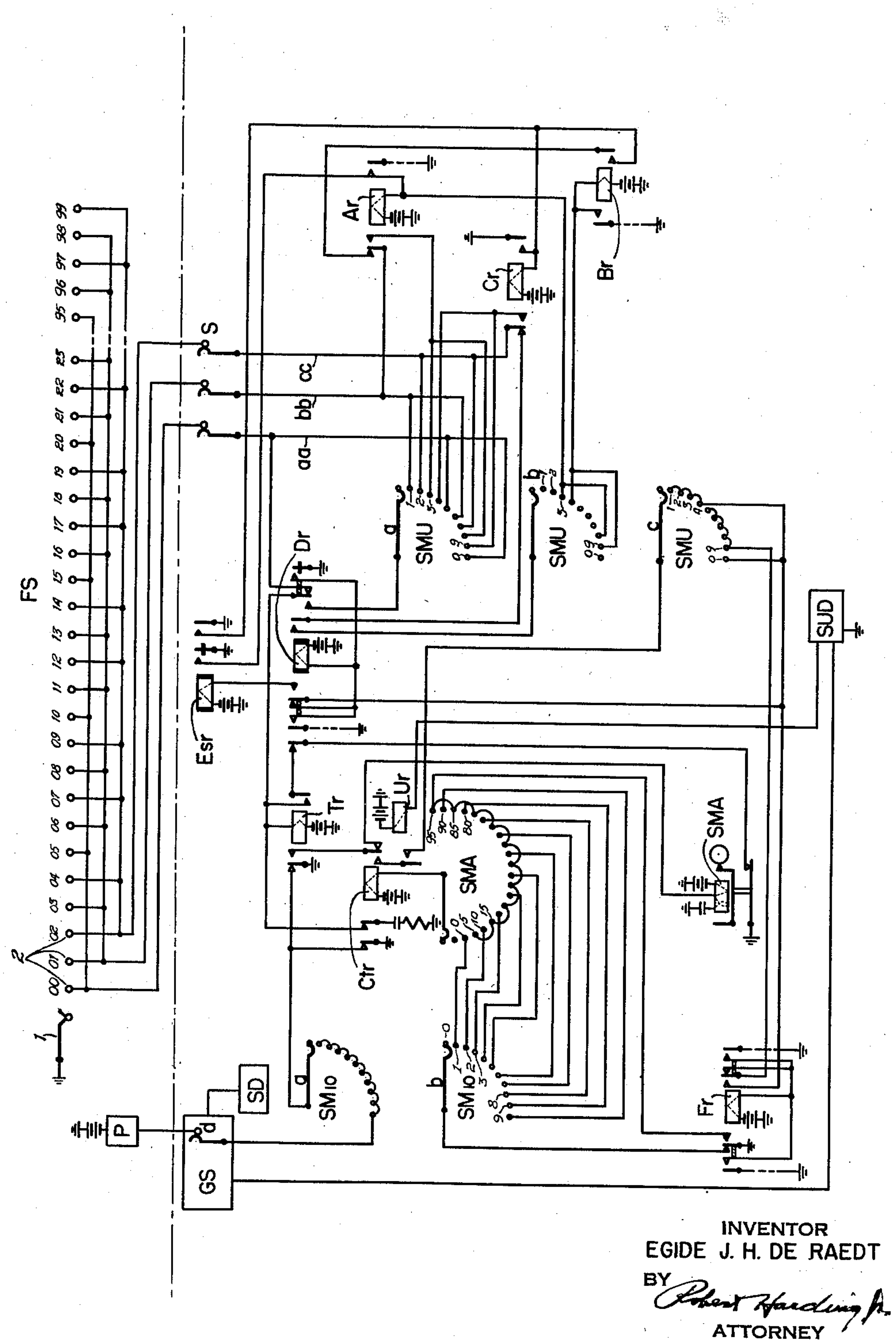
INVENTOR
EGIDE J. H. DE RAEDT
BY Robert Harding Jr.
ATTORNEY Patented Jan. 22, 1952 2,582,967

UNITED STATES PATENT OFFICE 2,582,967

MARKER-CONTROLLED FINAL SELECTOR CIRCUIT

Egide Jacob Hendrik De Raedt, Antwerp, Belgium, assignor to International Standard Electric Corporation, New York, N. Y., a corporation of Delaware Application July 1, 1947, Serial No. 758,451
In the Netherlands January 30, 1946

Section 1, Public Law 690, August 8, 1946
Patent expires January 30, 1966

5 Claims. (Cl. 179—18)

The present invention relates to an automatic telephone system or similar system for establishing connections and more particularly to the final selecting stage in such systems, in which single motion selectors are used, which are controlled by control circuits common to this selecting stage.

In the systems known hitherto, these control circuits comprised two marker switches for the tens and the units respectively, and it was necessary to provide a large number of wires (e. g. 19) from these marker switches to the circuits of the final selectors belonging to a group.

Such circuit arrangements were objectionable, however, because upon failure of the control circuit all cooperating final selectors of the group were disabled.

A second objection was that in such groups only one call at a time could be handled, because this one control circuit had to perform all controlling functions and thereby was permanently connected to the final selector circuits of the corresponding group.

The problem then arose to allot a plurality of control circuits to a group of final selectors in such a manner that each final selector could make use of any of the control circuits for that group.

If the solution of this problem is sought in the usual manner the number of required wires would become much too large. An object of the invention is to avoid this difficulty and to limit the number of wires required to a minimum.

In accordance with the invention this object is attained by an arrangement which includes the transmission of signals from a brush of the final selector at regular intervals to the associated control circuit, where the number of signals transmitted is registered, an arrangement which permits the use of a single wire to transmit said signals and thereby to position the final selector in accordance with the received "tens" digit, as hereafter shown in detail.

In the preferred arrangement illustrated, the final selector terminals are divided into two groups for each series of ten numbers, namely, numbers ending in 0 to 4 and in 5 to 9, a signal being sent when the brush engages the first contact of each group. The selector brush is first located on a terminal corresponding to the "tens" digit. It is then shifted to the succeeding "units" digit terminal. If the latter digit is in the second group an additional signal from the brush will suitably adjust the control unit.

For the individual digits in each group, if the digit is 0 or 5 no further shift is required. For the first two digits succeeding each of the latter digits, a normal marking will take place, while for the two remaining digits in each group, means is provided which is operated when neither of the two preceding digits in the group have been selected. This arrangement permits the use of one marker wire for terminals of numbers ending in 0 and 5, one marker wire for terminals of the first and third digits following the first marker wire digits, and one marker wire for the second and fourth terminals, so that a total of three marker wires will be sufficient because of the indicated arrangement.

The invention will be described with reference to the accompanying drawing in which an embodiment of the invention is diagrammatically illustrated.

A single control unit is shown, connected in the usual manner through a selector switch GS to the calling line or register, from which the usual two successive series of impulses representing the "tens" and "units" of the called number are transmitted. This selector connection includes a brush *d* connecting with a final selector drive P, battery and ground. The control unit is also connected through a switch S with a final selector FS having a grounded brush 1 contacting successive terminals 2 which represent successive numbers as indicated, starting with 00 and continuing to 99.

This arrangement is adapted to the use of a plurality of control units, similar to the one illustrated, which may be connected interchangeably to a plurality of final selectors. As soon as the final selector circuit is seized by a connection, all control circuits belonging to this group are started and one of the circuits will connect with the circuit of the line finder of the calling subscriber. The control unit will also be connected to a final selector by the switch S.

This unit includes a "tens" marker switch SM10, to which the "tens" digit is transmitted through switch GS as soon as the control circuit has been seized, and which is advanced by the usual switch drive SD. After receipt of the first impulse the final selector brush drive P is energized through brush *a* of switch SM10 and ground at back *Tr* and back *Ctr* in parallel. Each time the brush 1 passes one of the positions 00, 05, 10, 15, 20, 25 etc. relay *Tr* operates (ground, brush 1, wire *aa*, *Dr* back, *Tr*, battery, ground) and advances the marker switch SMA one step. As soon as the marker switch SMA is advanced a number of steps corresponding to the received "tens" digit, at which time the brush of SMA will have reached a terminal connected to the terminal of SM10 engaged by brush b thereof, relay Ctr will operate (ground, Fr back, SM10b, brush of SMA, Ctr, battery, ground) and disconnect one ground connection from the final selector drive circuit, with the result that when relay Tr is next operated upon contact of the brush 1 with the next "tens" digit terminal the second ground will be disconnected from the latter circuit and the brush 1 will be stopped. For instance, the brush 1 will stop in the switching position 00 if the "tens" digit 0 has been received, and in position 10 if the "tens" digit 1 has been received.

The impulses indicating the "units" digit are received by the marker switch SMU, which is stepped accordingly by the usual switch drive SUD. As soon as the latter digit has been received an operating circuit is closed, energizing relay Ur in the customary manner, as by a delayed action relay effective only after the digit impulses have ceased. If the received "units" digit is 0, 1, 2, 3 or 4 relay Dr is energized (ground, front Tr, front Ctr, front Ur, SMU brush c, back Dr, Dr winding, battery, ground). Relay Tr is thereby disconnected from marker wire aa and brush 1, and is connected to brush a of SMU through Dr front.

If the received "units" digit is 0, the latter brush will be connected through the last contact in the bank with wire aa, which will maintain relay Tr in energized condition and will locate the final selector permanently on the "tens" digit terminal. If the received "units" digit is 1 or 2, relay Tr will be released when relay Dr is energized, and the brush 1 will advance, stopping on a contact 2 representing a number ending in 1 or 2 due to the energizing of relay Tr (ground, brush 1, marker wire bb or cc, brush a of SMU, front Dr, Tr, battery, ground).

If the received "units" digit is 3, after Dr is energized, Tr releases, brush 1 advances and engages the succeeding contact of a numeral ending in 2, relay Ar will be energized (ground, brush 1, wire cc, Cr back, front Dr, brush b of SMU, Ar, battery, ground). Ar locks and connects contact 3 engaged by brush a of SMU with marker wire bb. When the selector brush 1 contacts the succeeding terminal of a number ending in 3 a circuit will therefore be completed through the latter wire and brush, and a front contact of Dr, to Tr, battery and ground, whereupon relay Tr is energized, arresting the brush on latter terminal. If the received "units" digit is 4, relay Dr operates and relay Tr is released in the same manner, and brush 1 advances. When the latter engages a contact for a numeral ending in 2 relay Br operates through brush b of SMU, locks and connects marker wire bb with relay Cr. When brush 1 engages the succeeding contact for a numeral ending in 3, relay Cr operates and connects marker wire cc with contact 4 engaged by brush a of switch SMU. Consequently, as soon as brush 1 reaches the "units" contact of a number ending in 4, relay Tr will operate and the brush 1 will stop.

If the received "units" digit is 5, 6, 7, 8 or 9, belonging to the second group, the circuit closed by relay Ur through brush c of switch SMU will energize relay Fr through one of its back contacts, and the latter relay will operate and lock, opening the circuit of relay Ctr, and closing the circuit of the final selector drive; and as soon as the brush 1 leaves its contact relay Tr is deenergized, actuating marker switch SMA which advances one step, its brush engaging one of the contacts intermediate to the "tens" contacts. Since all of said intermediate contacts are connected to each other and through a front contact of Fr to ground, relay Ctr operates; and when the brush 1 engages the next contact corresponding to 05, 15, 25 etc. relay Tr operates and stops the brush.

When relay Fr is energized it also closes a circuit from brush c of switch SMU through a back contact of Dr to the latter relay; but since the latter is of the delayed closing type, it does not close until brush 1 has been arrested in the "five" position last described. When relay Dr is thus operated it connects relay Tr to marker wire aa through brush a of switch SMU. If the "units" digit is 5, this connection will hold relay Tr in energized condition and will permanently halt the brush 1. If the "units" digit is 6 or 7 the brush will be advanced and will stop on the appropriate contact 2 by completing circuits through marker wire bb or cc in the manner set forth for "units" digits 1 and 2. If the "units" digit is 8 or 9 operation will be the same as that described above for digits 3 and 4.

When relay Dr is energized a circuit through Esr is closed from ground, battery, Esr winding, Dr front, Fr front, brush c of SMU, Ur front, Ctr front, Tr front to ground. As relay Esr is of the delayed action type, it does not operate until brush 1 has been finally located on the contact 2 corresponding to the called number, and thus said operation indicates the end of the selection. Relay Esr operates relays Ar and Cr, placing the final selector circuits in condition for an unlimited test for PBX lines.

By the circuit arrangement described above, the number of connecting wires between the final selector and the control circuit which are required for the marking may be reduced to three.

What is claimed is:

1. In an automatic telephone system, a final selector control system comprising a final selector switch including a bank of successively numbered terminals, a brush engaging the terminals in succession and a driving means for said brush, a control unit, means for connecting said control unit to said driving means, a first marker circuit connecting a series of said terminals at equal intervals including the "tens" terminals and dividing all said terminals into groups each beginning with a terminal of said series, additional marker circuits each connecting corresponding terminals in all groups, means for connecting said marker circuits to said control unit, means in said control unit for storing the "tens" digit transmitted from the calling line, means in said control unit and responsive to the initiation of the train of pulses representing the "tens" digit for energizing said driving means for said brush, a stepping switch in said control unit, driving means for said stepping switch connected to said first marker circuit for stepping said switch under control of said final selector switch, means under control of said "tens" digit storing means for disconnecting said stepping switch driving means so as to stop said stepping switch in a position determined by said storing means, means controlled by the setting of said stepping switch and said selector switch for arresting said energizing means for said brush driving means when said brush reaches the terminal corresponding to the "tens" digit of the called number, means in said control unit for storing the "units" digit transmitted from said calling line, means initiated by the operation of said "units" digit storing means for shifting the control of said energizing means to said "units" digit storing means, and means controlled by the setting of said "units" digit storing means for connecting said disconnecting means for said energizing means to a particular one of said marker circuits whereby said brush may be arrested on the terminal corresponding to the "units" digit of the called number.

2. In a telephone system the combination as set forth in claim 1, in which the first marker circuit is connected to every fifth terminal.

3. In a telephone system the combination, as set forth in claim 1, in which each additional marker circuit is connected to a plurality of terminals in each group, and the means for arresting the energizing means for stopping the brush on the "units" terminal includes a separate actuating circuit for each terminal in a group connected to an additional marking circuit.

4. In a telephone system the combination, as set forth in claim 1, in which the terminals in each group are divided into successive subgroups, each terminal in a subgroup being connected to a different marker circuit, and in which the means for arresting the energizing means so as to position the brush on the "units" terminal includes separate circuits for the subgroups.

5. In a telephone system the combination, as set forth in claim 1, in which the first marker circuit is connected to every fifth terminal, a second marker circuit is connected to every first and third terminal following each first marker circuit terminal, and a third marker circuit is connected to every second and fourth terminal following each first marker circuit terminal.

EGIDE JACOB HENDRIK DE RAEDT.

REFERENCES CITED

The following references are of record in the file of this patent:

UNITED STATES PATENTS

| Number | Name | Date |
|---|---|---|
| 1,343,903 | Clausen | June 22, 1920 |
| 1,840,950 | Hatton et al. | Jan. 12, 1932 |
| 1,914,334 | Richardson | June 20, 1933 |
| 1,922,237 | Escott | Aug. 15, 1933 |
| 2,057,890 | Feist | Oct. 20, 1936 |
| 2,087,405 | Humphries | July 20, 1937 |
| 2,172,947 | Taylor et al. | Sept. 12, 1939 |
| 2,354,682 | Herbig | Aug. 1, 1944 |

FOREIGN PATENTS

| Number | Country | Date |
|---|---|---|
| 392,280 | Great Britain | May 18, 1933 |
| 563,666 | Great Britain | Aug. 24, 1944 |
| 712,328 | France | Sept. 30, 1931 |
| 811,704 | France | Apr. 21, 1937 |